(No Model.) 2 Sheets—Sheet 1.

T. C. PATTERSON.
PLANTER.

No. 454,183. Patented June 16, 1891.

WITNESSES:
A. E. Glascock,
M. E. Lansdale.

INVENTOR
T. C. Patterson,
BY
John S. Duffie
ATTORNEY.

(No Model.) 2 Sheets—Sheet 2.
T. C. PATTERSON.
PLANTER.
No. 454,183. Patented June 16, 1891.
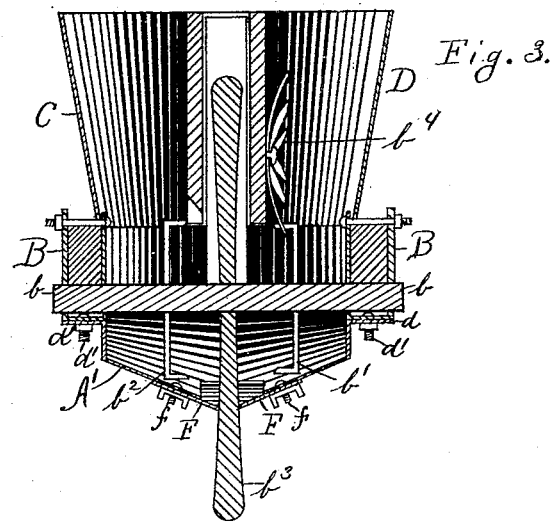
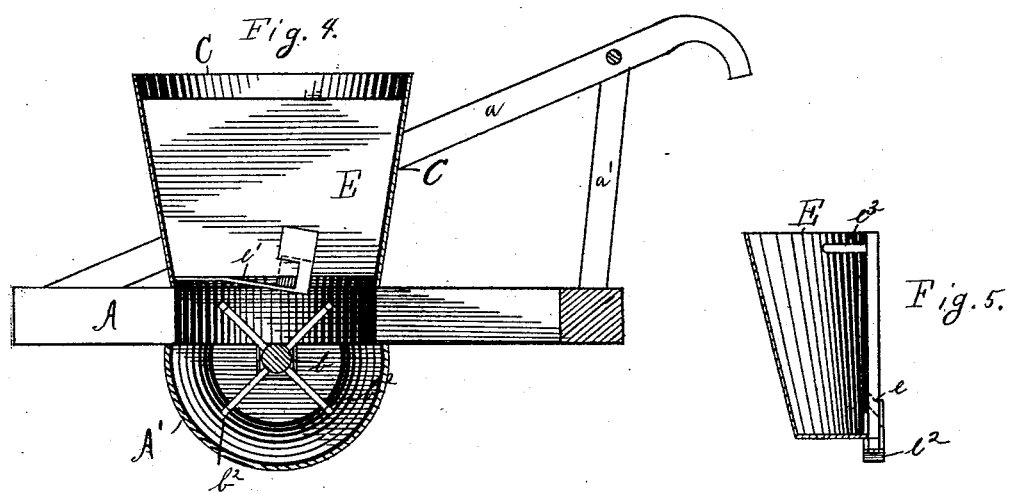
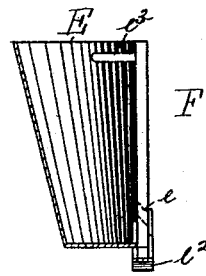
WITNESSES:
A. E. Glascock,
M. E. Lansdale,
INVENTOR
T. C. Patterson
BY
John S. Duffie
ATTORNEY.

UNITED STATES PATENT OFFICE.

THOMAS C. PATTERSON, OF HICO, TEXAS.

PLANTER.

SPECIFICATION forming part of Letters Patent No. 454,183, dated June 16, 1891.

Application filed November 15, 1890. Serial No. 371,503. (No model.)

*To all whom it may concern:*

Be it known that I, THOMAS C. PATTERSON, a citizen of the United States, residing at Hico, in the county of Hamilton and State of Texas, have invented certain new and useful Improvements in Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to planters; and it consists in the novel construction and arrangement of its parts.

Figure 1:
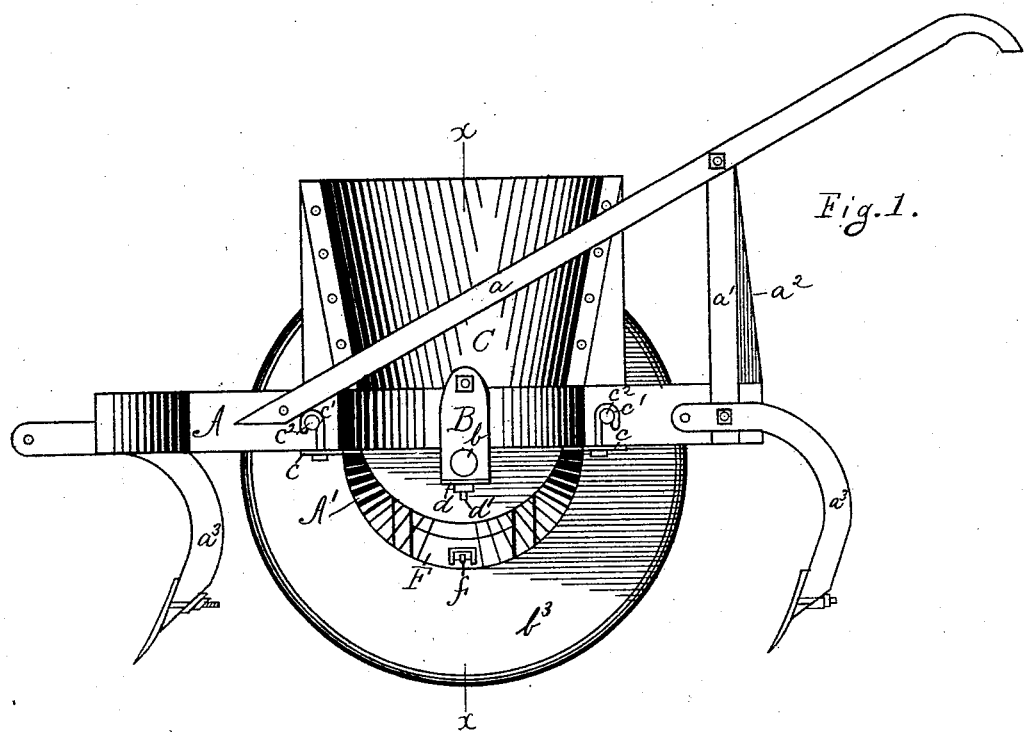
Figure 2:
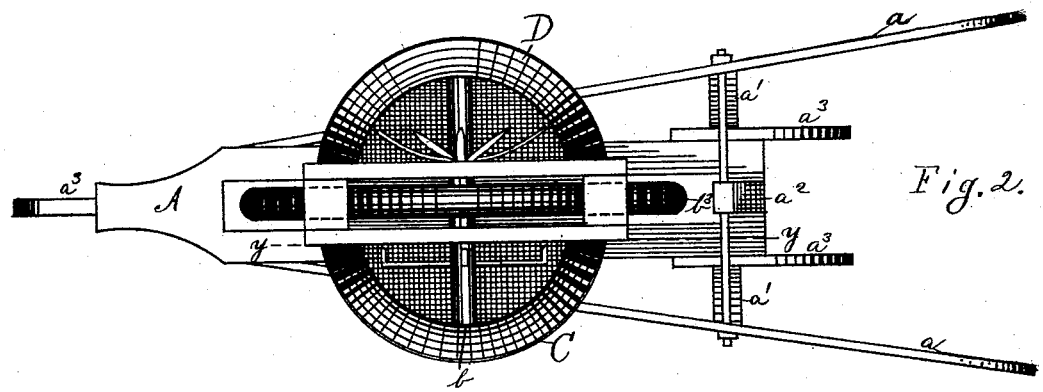

In the accompanying drawings, Figure 1 is a side elevation of my invention. Fig. 2 is a top or plan view of Fig. 1. Fig. 3 is a cross-sectional view of Fig. 1, cut through on the line $x\,x$. Fig. 4 is a detail sectional view of Fig. 2, cut through on the line $y\,y$, showing the attachment E in position. Fig. 5 is a detail view of the attachment E, partly in section.

My invention is described as follows: It consists of a body A, handles $a$, uprights $a'$, brace $a^2$, and standards $a^3$, provided with suitable shovels, all being secured in place by proper bolts and nuts. The body A of the planter is bulged in its middle, and these bulges are provided with bearings B, in which is journaled the axle $b$, which in turn is provided with agitators $b'$ and $b^2$, and the double concave bearing-wheel $b^3$. Said planter is provided with hoppers C and D, one on each side of the concave wheel. Said hoppers are secured to the body A over the bulges in the middle of said body. The detachable bottoms A' of said hoppers are similar, and are provided with flanges $c$, in which are hooks $c'$, which catch over bolts $c^2$ in the body A. Said detachable bottoms also have flanges $d$, through a perforation of which passes a bolt $d'$, that is attached to the bottom of the bearings B, and thus it will be seen that by unhooking the hooks and releasing the flanges $d$ the said bottoms may be detached from the planter. The arms of the agitator $b'$ in the hopper D meshes with the arms of an agitator $b^4$ in the upper part of said hopper. Agitator $b^4$ is journaled on a bolt in the wall of hopper D, and is intended to keep the fertilizer from banking, yet not to interfere with the free passage of the same from the upper to the lower part of the hopper.

The hopper C is adapted to receive a second or inner hopper E, which fits snugly in said hopper C, (see Fig. 4,) and has in its lower part a perforation $e$. Said inner hopper also has a spring $e'$, secured to its bottom, and said spring is provided on its free end with a double cut-off $e^2$, one arm passing up through the bottom of said attachment and working over the inner mouth of the perforation $e$, and the other working over the outer mouth of said perforation. The arms of said cut-off operate alternately over said perforation and act as a double cut-off, the outer mouth being closed while the inner is open, and vice versa. This cut-off is operated by the agitator $b^2$ in the hopper C, as shown in Fig. 4. Said inner hopper E is provided with a handle $e^3$, by means of which it may be lifted out of said hopper C. The bottoms of the hoppers C and D are provided with slides F, which are adjusted and held in place by thumb-screw $f$.

My invention is operated as follows: When the grain is to be planted in hills, the bottom of the hopper C is removed, and the hopper E is placed in said hopper C, and the grain is put in the inner hopper E and the fertilizer in the hopper D, and the slide in the bottom of said hopper D is adjusted to regulate the flow of the fertilizer. As the planter moves along, the front plow makes a furrow and the wheel $b^3$ tracks in said furrow and serves as a guide to the seed and fertilizer, and the rear plows $a^3$ cover the seed and fertilizer. When the seed is to be sowed in rows, the attachment E is removed from the hopper C and the seed is allowed to flow through the opening left by the slide in the bottom of hopper C, and the fertilizer is distributed as above described. The arms of the agitator $b'$ mesh with the arms of the agitator $b^4$ and keeps it moving, and the fertilizer is thus prevented from banking up in said hopper.

Having described my invention, what I claim as new, and desire to secure by Letters Patent, is—

1. The planter having the body A, bulged in its middle, handles $a$, uprights $a'$, standards and plows $a^3$, bearings B, adjusted to the body A, as shown, and having the bolt $d'$, axle $b$, journaled in said bearings and having the double concave wheel $b^3$ and agitators $b'$ and $b^2$, agitator $b^4$, journaled to the side of hopper D and operated by the agitator $b'$, hoppers C and D, having the adjustable bottoms provided with slides F and thumb-screws $f$, and inner hopper E, having the spring and double cut-off $e'$ and perforation $e$, said cut-off adapted to be operated by the agitator $b^2$, all substantially as shown and described, and for the purposes set forth.

2. In a planter, substantially as above described, the combination of the body A, provided with suitable handles and plow-standards, the central double concave wheel $b^3$, secured to an axle journaled in said body, agitators $b'$ and $b^2$, secured to said axle, hoppers C and D, secured on the top of said body, agitator $b^4$, journaled to the inner wall of hopper D and meshing with agitator $b'$, detachable bottoms A', secured to the lower face of said body and having the regulators F, and inner hopper E, fitting in the hopper C and having the perforation $e$ and double cut-off $e'$, operated by the agitator $b^2$, substantially as shown and described, and for the purposes set forth.

3. The combination of the beam A, having the central annular enlargement and provided with suitable handles and plow-standards, central wheel $b^2$, journaled in said beam in suitable bearings, agitators $b'$ and $b^2$, secured to the axle of said wheel and working in said annular enlargement, hoppers C and D, secured to the upper face of said enlargement, detachable bottoms A', secured to the lower face of said enlargement and having the regulators F, agitator $b^4$, journaled to the inner wall of the hopper D and meshing with agitator $b'$, and inner hopper E, fitting in the hopper C and having the perforation $e$ and double cut-off $e'$, operated by the agitator $b^2$, substantially as shown and described, and for the purposes set forth.

4. The combination of the beam A, having the central annular enlargement and provided with suitable handles, standards, beams, and bolts, central double concave wheel $b^3$, journaled in said enlargement, agitators $b'$ and $b^2$, secured to the axle of said wheel and working in said enlargement, hoppers C and D, secured to the upper face of said enlargement, detachable bottoms A', having the flanges $c$ and $d$, hooks $c'$, and regulators F, agitator $b^4$, journaled to the inner wall of hopper D and meshing with agitator $b'$, and inner hopper E, fitting in the hopper C and having the perforation $e$ and double cut-off $e'$, operated by the agitator $b^2$, substantially as shown and described, and for the purposes set forth.

5. The combination, with a planter, substantially as shown and described, of the hopper E, fitting in hopper C and having through its inner wall the perforation $e$, spring $e'$, secured to the bottom of said hopper, and double cut-off $e^2$, adapted to be operated by the agitator $b^2$, all substantially as shown and described, and for the purposes set forth.

In testimony whereof I affix my signature in presence of two witnesses.

THOMAS C. PATTERSON.

Witnesses:
 F. H. SNIDER,
 S. L. TURNER.